UNITED STATES PATENT OFFICE.

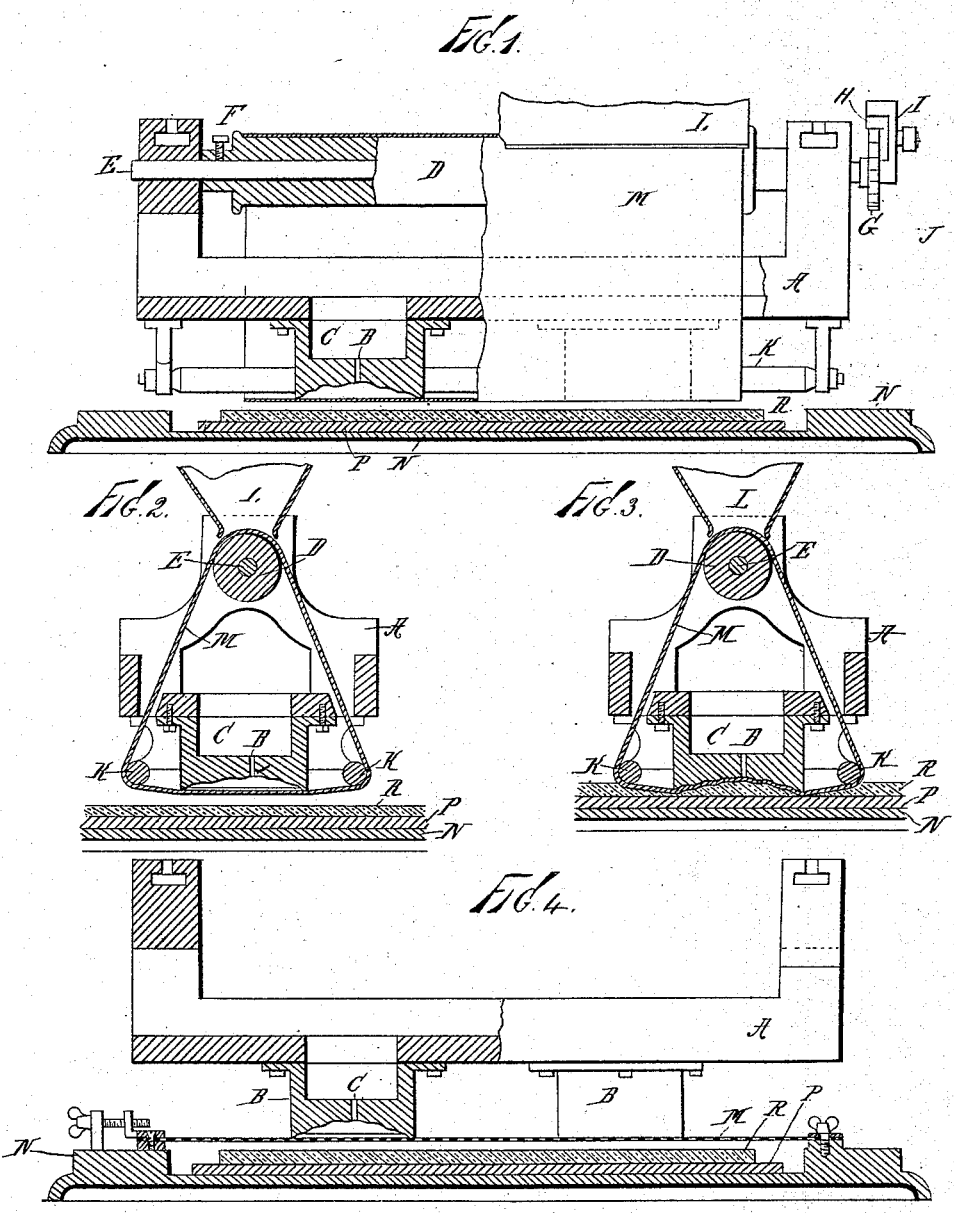

JAMES H. MITCHELL, OF PHILADELPHIA, PENNSYLVANIA.

DIAPHRAGM-DIE FOR PLASTIC MOLDING.

SPECIFICATION forming part of Letters Patent No. 413,453, dated October 22, 1889.

Application filed December 10, 1888. Serial No. 293,225. (No model.)

*To all whom it may concern:*

Be it known that I, JAMES H. MITCHELL, a citizen of the United States, and a resident of Philadelphia, in the county of Philadelphia and State of Pennsylvania, have invented certain new and useful Improvements in Diaphragm-Dies for Plastic Molding, of which the following is a specification.

My invention relates especially to means and mechanism employed for molding plastic material of any kind, and has for its object the provision of a cheap and simple arrangement of die or dies whereby the material molded is kept from actual contact with the face of the die, while closely conforming thereto, and wherein all delicate clearing devices are done away with and choking or clogging of the moving parts is obviated.

To attain the desired end my invention consists, essentially, in the combination, with a cutting and molding die and means for operating the same, of an elastic diaphragm extending over the face of the die, all of which will be hereinafter first fully described, and then pointed out in the claims.

I have shown my improvement as applied to the cutter-head of a cake-machine for bakers' use; but it is obvious that the invention may be employed with any machine used for cutting and molding plastic material other than dough.

In the drawings, Figure 1 is a sectional elevation of a cutter-head wherewith my device is employed. Fig. 2 is a cross-sectional view showing the die before it is depressed, and Fig. 3 is a like view with the die depressed. Fig. 4 shows a modified arrangement of diaphragm.

Like letters of reference indicate corresponding parts.

A is the main frame of the cutter-head. B are the dies secured thereto and provided each with an air-vent C.

D is a roller secured to a shaft E by means of a set-screw F, said shaft being journaled in the main frame A and made to draw therefrom and from roller D when the set-screw is removed.

G is a ratchet-wheel, and H a pawl, mounted upon an operating-arm I, to which a pitman J is pivoted.

K K are rollers mounted in the main frame A at each side of the dies.

L is a hopper mounted above roller D and arranged to contain flour.

M is a diaphragm or belt of thin elastic material, passing around the rollers D and K over the face of the dies B.

N is a portion of the bed of a machine, and P the belt which carries the dough R to be formed into cakes.

The operation of my device is as follows: The machine being put in motion, the dough is carried beneath the cutter-head in the usual manner, and the cutter-head descends thereon. As soon as the diaphragm strikes the dough it is forced up into the face of the die by the dough, stretching and conforming to the configuration thereof, and the dough filling the die in precisely the same manner as would be the case without the interposition of the diaphragm, and the edges of the die separating the cake from the sheet of dough. As the die rises, the diaphragm contracts, expelling the cake from the die and depositing it upon the carrying-belt. At each movement of the cutter-head the roller D is turned a portion of a revolution by means of the ratchet upon its shaft, coating the diaphragm-belt with the flour and presenting a new surface beneath the die. It will thus be seen that the cutter-head and dies may be greatly simplified in construction, and therefore reduced in cost. The face of the die and the cutter-head itself are protected from direct contact with the material molded, and choking of the parts or sticking of the material thereto obviated, while at the same time the molding is fully and accurately accomplished.

There are many materials molded in such a state that the use of flour, or its equivalent, on the face of the diaphragm may be dispensed with, and in such cases a stationary elastic diaphragm may be used, such as is illustrated in Fig. 4.

Having now fully described my invention, what I claim as new is—

1. The combination, with a reciprocating cutting and molding die and means for operating the same, of a movable elastic expelling-diaphragm located between the face of the die and the material to be cut and molded and a flat unbroken support for said material, substantially as shown and described.

2. The combination, with a cutting and molding die, of a movable elastic expelling-diaphragm passing over the face of the die and a flat unbroken table or support beneath the face of the die, substantially as shown and described.

Signed at New York, in the county of New York and State of New York, this 8th day of December, A. D. 1888.

JAMES H. MITCHELL.

Witnesses:
A. M. PIERCE,
THEO. L. POPP.